US006621724B1

(12) United States Patent
Liu

(10) Patent No.: US 6,621,724 B1
(45) Date of Patent: Sep. 16, 2003

(54) ELECTRICAL POWER STRIP AND PLUG FOR VEHICLE ACCESSORY

(75) Inventor: Yiu C. Liu, Lake Oswego, OR (US)

(73) Assignee: Pacific Carnetta, Inc., Wilsonville, OR (US)

( * ) Notice: Subject to any disclaimer, the term of this patent is extended or adjusted under 35 U.S.C. 154(b) by 0 days.

(21) Appl. No.: 10/185,315

(22) Filed: Jun. 28, 2002

(51) Int. Cl.$^{7}$ .......................... H02M 1/00; H01R 41/00

(52) U.S. Cl. .......................................... 363/146; 439/33

(58) Field of Search ................................ 361/144, 145, 361/146; 439/33, 102, 106, 109, 133, 597, 600, 601, 915

(56) References Cited

U.S. PATENT DOCUMENTS

| | | | | |
|---|---|---|---|---|
| 4,109,988 A | | 8/1978 | Olson | |
| 4,136,919 A | | 1/1979 | Olson | |
| 4,248,494 A | | 2/1981 | McDonald et al. | |
| D300,626 S | | 4/1989 | Crutcher et al. | |
| 4,925,396 A | | 5/1990 | Grover | |
| 4,936,796 A | | 6/1990 | Anderson, Jr. | |
| 5,007,863 A | | 4/1991 | Xuan | |
| D318,648 S | | 7/1991 | Collins | |
| D359,269 S | | 6/1995 | Wharton | |
| 5,551,884 A | | 9/1996 | Burkhart, Sr. | |
| 5,599,204 A | | 2/1997 | Glassford | |
| 5,714,805 A | * | 2/1998 | Lobaugh | 307/10.1 |
| 5,766,034 A | * | 6/1998 | Block et al. | 439/553 |
| 5,893,772 A | | 4/1999 | Carmo et al. | |
| 5,993,262 A | | 11/1999 | Kowdynski et al. | |
| 6,007,373 A | | 12/1999 | Chew | |
| 6,054,657 A | * | 4/2000 | Liao | 200/51.02 |
| 6,057,610 A | | 5/2000 | Nierescher | |
| 6,447,302 B1 | * | 9/2002 | Davis | 439/34 |
| 6,494,728 B1 | * | 12/2002 | Gorman | 439/140 |

OTHER PUBLICATIONS

ANSI/NEMA WD Jun. 1997; *NEMA Configurations for Specific Purpose Plugs and Receptacles* (pp. 141–144); 4 pages; 1997.

*Leviton D–503 Comprehensive Wiring Device Catalog*—Section D (pp. D1–D16); 17 Pages; Leviton Manufacturing Co. Inc. 2001; Little Neck, NY.

*Leviton D–503 Comprehensive Wiring Device Catalog*—Section H (pp. H1–H15); 15 Pages; Leviton Manufacturing Co. Inc. 2001; Little Neck, NY.

*Leviton D–503 Comprehensive Wiring Device Catalog*—Section J (pp. J1–J23); 23 Pages; Leviton Manufacturing Co. Inc. 2001; Little Neck, NY.

*Leviton D–503 Comprehensive Wiring Device Catalog*—Section K (pp. K2–K14); 13 Pages; Leviton Manufacturing Co. Inc. 2001; Little Neck, NY.

* cited by examiner

*Primary Examiner*—Matthew V. Nguyen

(57) ABSTRACT

An electrical power strip for making power available from a vehicular DC power system to a vehicle accessory. The power strip includes at least one polarized receptacle and a conductor. The receptacle includes a slot and a positive contact aligned with the slot. The conductor includes a first end connected to the positive contact and a second end connectable to a positive terminal of the vehicular DC power system. The slot includes at least three extensions each oriented at substantially equal degrees apart from adjacent extensions. A polarized plug for use with a DC powered vehicle accessory. The polarized plug includes an insulating plug body and a prong mounted to the insulating plug body. The prong has at least three wings each oriented at substantially equal degrees apart from adjacent wings.

21 Claims, 12 Drawing Sheets

ELECTRICAL POWER STRIP AND PLUG FOR VEHICLE ACCESSORY

BACKGROUND OF THE INVENTION

The present invention relates generally to an electrical power strip, and more particularly, to an electrical power strip connectable to a 12 or 24 volt DC electrical power system, such as a vehicular battery or a vehicular alternator, for making power available to vehicle accessory items.

Some vehicle accessory items, such as hand-held automobile vacuum cleaners, electrical shavers, and the like, are intended for operation using relatively low electric current (i.e., 2–6 amps). These low current vehicle accessory items typically employ a vehicle accessory plug compatible with a plug-receiving socket (i.e. a cigarette lighter socket) in a vehicle. In comparison, other vehicle accessory items, such as hair dryers, coffee makers, and the like, require relatively high electric current levels (i.e. 8–20 amps) to operate. These high current vehicle accessory items suffer from a problem of heat build-up in the electrical connector at electric current levels of 10–15 amps or more, if a vehicle accessory plug is used. When a vehicle accessory plug is plugged into a plug-receiving socket (i.e. a cigarette lighter socket) in a vehicle, a contact area is formed between the positive connector of the plug and the positive connector of the socket. Since the contact area located at the tip of the vehicle accessory plug is relatively small, the electric current density in the contact area will be relatively great with high current loads. The greater the current density, the more heat is generated in the contact area. As a result, the problem of heat build-up seriously impairs the operating characteristics of these high current vehicle accessory items and significantly reduces their life of use. The same phenomenon may be true with the negative contact, depending on the surface area thereof.

The present invention overcomes such shortcomings of the prior art by providing an electrical power strip with relatively high current capacity and reduced current density to avoid the problem of heat build-up. In addition, the present invention provides a blocking mechanism inside a polarized receptacle of the electrical power strip for preventing improper connection to the polarized receptacle as well as for enabling proper connection to the polarized receptacle by a specially manufactured polarized plug of the vehicle accessory item. Preferably, the physical appearance of the plug prongs and corresponding receptacle slots is representative of the respective polarity, with a first prong having a cross-sectional shape in a general form of a "+" (plus) sign, a second prong having a cross-sectional shape in a general form of a "–" (negative) sign, a first slot having a generally "+"-shaped aperture, and a second slot having a generally "–"-shaped aperture.

DETAILED DESCRIPTION

Figure 1:
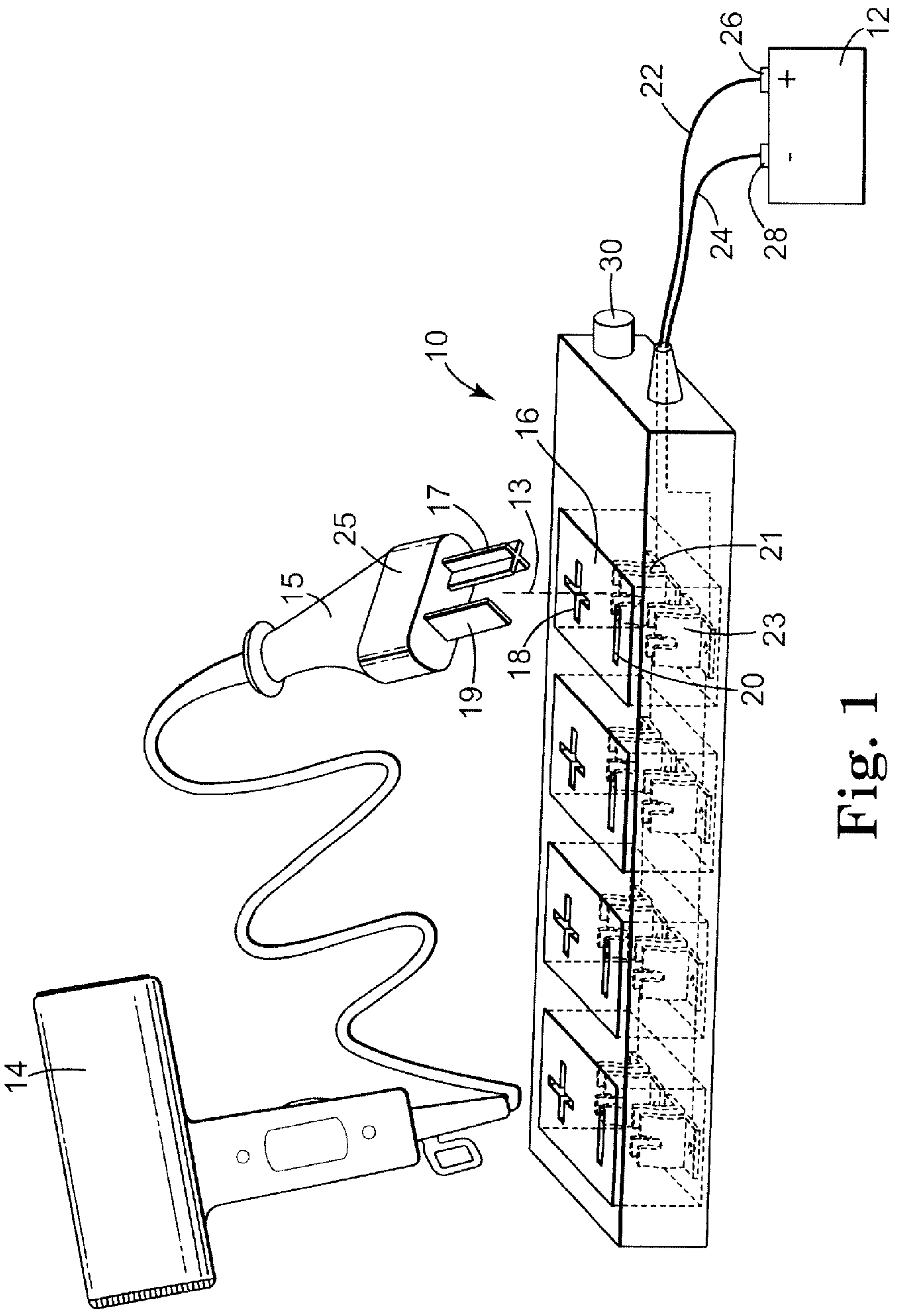
FIG. 1 is a perspective view of an electrical power strip together with a high current vehicle accessory item having a polarized plug according to the present invention.
Figure 2:
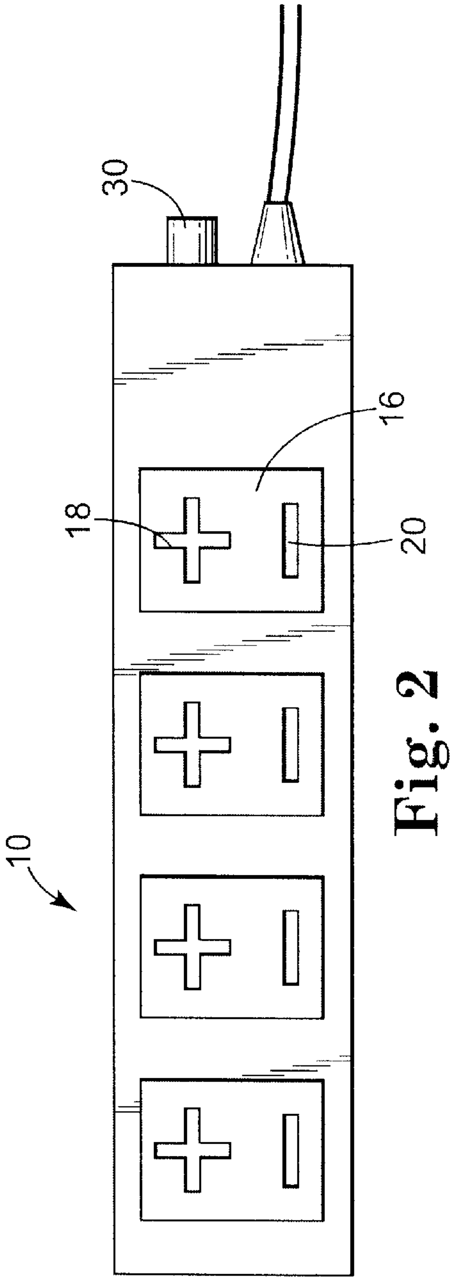
FIG. 2 is a top view of the electrical power strip shown in FIG. 1.

Referring now to the figures and most particularly to FIGS. 1 and 2, a perspective view and a top view of an electrical power strip 10 may be seen. It is to, be understood that the electrical power strip 10 is designed for use in land motor vehicles or personal water craft such as boats, particularly connectable to a 12 or 24 volt vehicular DC power system 12, such as a vehicular battery or an alternator of a land or marine vehicle. The electrical power strip 10 preferably includes one or more polarized receptacles 16, a first conductor 22, and a second conductor 24. The power strip 10 may include a switch 30 for turning the electrical power strip 10 on and off. The polarized receptacle 16 preferably includes a first slot 18, a second slot 20, a positive contact 21, and a negative contact 23. The positive contact 21 and the negative contact 23 are located inside the polarized receptacle 16. The positive contact 21 is preferably aligned with the first slot 18, and similarly, the negative contact 23 is preferably aligned with the second slot 20.

In order to prevent improper connection to the polarized receptacles, the shape of the first slot 18 is substantially different from the shape of the second slot 20. In its most general form, the first slot 18 includes an axis 13 and at least three extensions extending from the axis 13 and each oriented at substantially equal degrees apart from adjacent extensions. As shown in FIG. 1 and FIG. 2, the first slot 18 preferably has a generally "+"-shaped aperture with four extensions each oriented at 90 degrees apart from adjacent extensions. In other words, each extension of the generally "+"-shaped slot is perpendicular to the adjacent extensions. The second slot 20 preferably has a generally "–"-shaped aperture with only one extension. In an alternative embodiment, the first slot 18 may have a "Y" shape with three extensions each oriented at 120 degrees apart from adjacent extensions. In a further alternative embodiment, the first slot 18 may have an "X" shape with four extensions extending from the axis. The extensions of the "X"-shaped slot are not perpendicular to each other. Although certain shapes of the first slot 18 have been described with reference to these embodiments, those skilled in the art will recognize that changes can be made in form and detail without departing from the spirit and scope of the invention.

The first conductor 22 preferably includes a first end portion electrically connected to the positive contact 21 of the polarized receptacle 16 and a second end portion electrically connectable to a positive terminal 26 of a vehicular DC power system 12, such as a vehicular battery anode or a vehicular alternator. In like manner, the second conductor 24 preferably includes a first end portion electrically connected to the negative contact 23 and a second end portion electrically connectable to a negative terminal 28 of the vehicular DC power system 12. The conductors 22 and 23 are preferably conventional insulated electrical wires.

Figure 3:
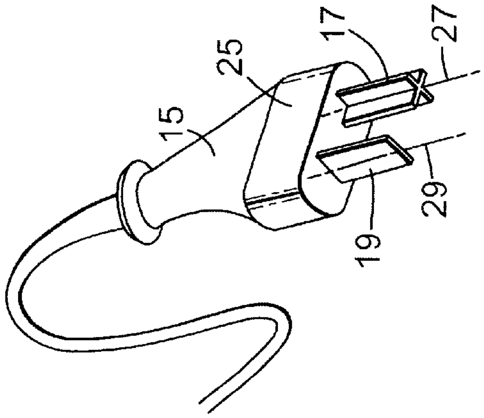
FIG. 3 is a perspective view of the polarized plug of FIG. 1 useful in the practice of the present invention.

A high current vehicle accessory item 14, such as a hair drier, a coffee maker, and the like for use in land motor vehicles or boats, preferably includes a specially designed and manufactured polarized plug 15. The polarized plug 15 preferably includes an insulating plug body 25, a first prong 17, and a second prong 19. The first prong 17 and the second prong 19 are mounted to the plug body. The shape of the first prong 17 is substantially different from the shape of the second prong 19. Referring now to FIG. 3, in the practice of one aspect of the present invention, the first prong 17 has an axis 27 along the direction of the prong 17. The prong 17 includes at least three wings extending from the axis 27 and each oriented at substantially equal degrees apart from adjacent wings. Preferably, the first prong 17 has four wings extending from the axis 27 and each oriented at 90 degrees apart from adjacent wings. The second prong 19 has only one wing. In other words, the first prong has a cross-sectional shape in a general form of a "+" (plus) sign; the second prong has a cross-sectional shape in a form of a "–" (minus) sign. The first prong has an axis 27 along the direction of the prong. The second prong has an axis 29 along the direction of the prong. The two axes are aligned in parallel. In an alternative embodiment, the first prong 17 has a "Y" shape with three wings each oriented at 120 degrees apart from adjacent wings. In a further alternative embodiment, the first prong 17 has an "X" shape with four wings extending from the axis 27. The wings of the "X"-shaped plug are not perpendicular to each other. Although the shapes of the first prong 17 have been described with reference to these embodiments, those skilled in the art will recognize that changes can be made in form and detail without departing from the spirit and scope of the invention.

Referring back to FIG. 1, it is to be understood that the first prong 17 is shaped and sized to mate with the first slot 18 of the polarized receptacle 16; and likewise, the second prong 19 is shaped and sized to mate with the second slot 20 of the polarized receptacle 16. After being plugged into the first slot 18 and the second slot 20 of the polarized receptacle 16, the first prong 17 and the second prong 19 are electrically connected to the positive contact 21 and the negative contact 23 inside the receptacle 16, respectively. Consequently, a complete circuit is formed for the vehicle accessory item 14 to be electrically connected with the vehicular DC power system 12.

The polarized plug with the generally "+" and "–"-shaped prongs and the power strip with the generally "+" and "–"-shaped slots offer important advantages. Users of the vehicle accessory items can visually distinguish the polarity of the prongs and slots by just observing their appearances. In particular, the general form of the "+" sign indicates positive terminals; and similarly, the general form of the "–" sign indicates negative terminals. In addition, the generally "+"-shaped prong can never be accidentally plugged into the generally "–"-shaped slot because of incompatibility of the plug and slot shapes. Accordingly, improper connections can be easily avoided by using the generally "+" and "–"-shaped prongs and slots. The polarized plug and the power strip in accordance with the present invention therefore provide a high degree of protection against reversed polarity for the vehicle accessory items.

Figure 4:
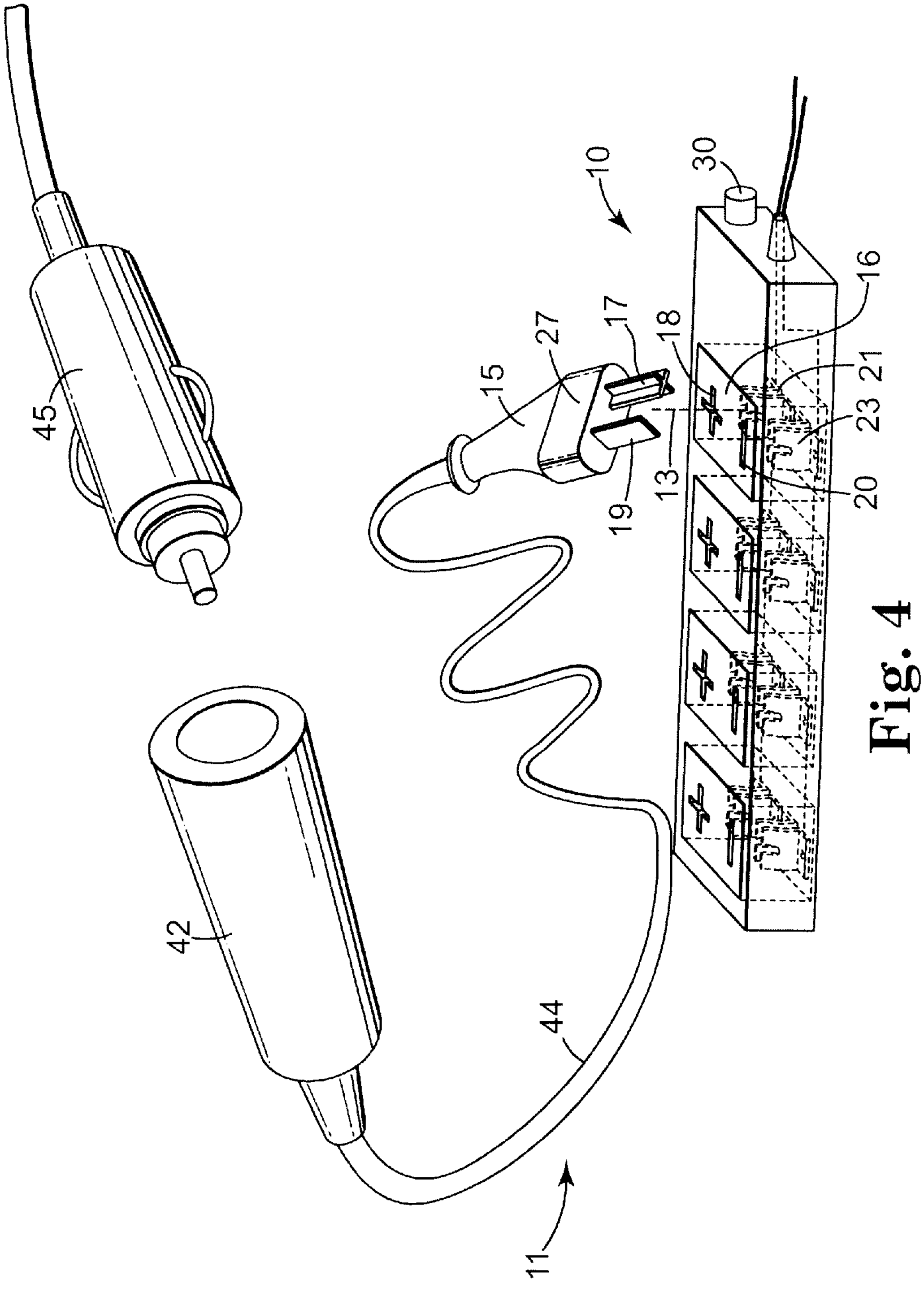
FIG. 4 is a perspective view of an electrical adaptor suitable for connecting a conventional vehicle accessory item having a vehicle accessory plug to the electrical power strip of the present invention.

Referring now to FIG. 4, the electrical power strip 10 further includes an electrical adaptor 11 suitable for connecting a conventional vehicle accessory item with a standard plug 45 to the electrical power strip 10 of the present invention. It is to be understood that the electrical adaptor 11 preferably includes a conventional plug-receiving socket 42 and a polarized plug 15 connected by a cable 44 having a pair of conductors (not shown). The plug-receiving socket 42 is designed for receiving a conventional vehicle accessory plug 45. The polarized plug 15 of the adaptor 11, which includes the first prong 17 and the second prong 19, is the same as the plug described above.

Figure 5:
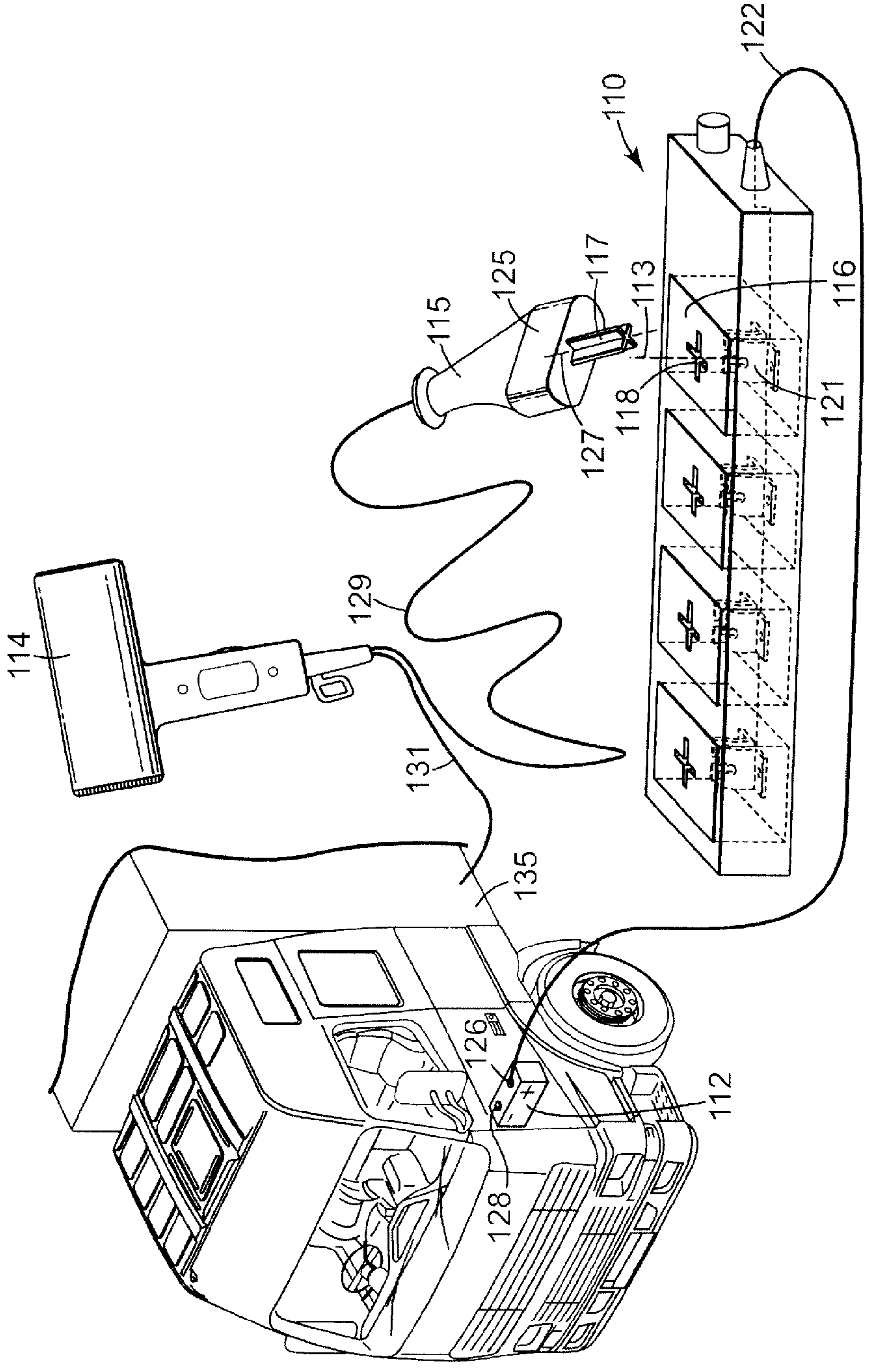
FIG. 5 is a perspective view of an alternative embodiment of the electrical power strip and plug connected to a high current vehicle accessory item in accordance with the present invention.

In an alternative embodiment of the present invention as shown in FIG. 5, the polarized receptacle 116 of the power strip 110 includes only one slot 118 instead of two slots. A positive contact 121 is located inside the polarized receptacle 116 and is preferably aligned with the slot 118. A conductor 122 preferably includes a first end portion electrically connected to the positive contact 121 of the polarized receptacle 116 and a second end portion electrically connectable to a positive terminal 126 of a vehicular DC power system 112, such as a vehicular battery anode or a vehicular alternator.

A high current vehicle accessory item 114 preferably includes a specially designed and manufactured polarized plug 115 electrically connected to the positive pole of the accessory through a conductor 129. The polarized plug 115 includes only one prong 117 instead of two prongs.

It is to be understood that the prong is shaped and sized to mate with the slot of the polarized receptacle. After being plugged into the slot of the polarized receptacle 116, the prong 117 is electrically connected to the positive contact 121. Meanwhile, a first end portion of a conductor 131 can be electrically connected to the negative terminal of the vehicle accessory 114; a second end portion of the conductor 131 can be electrically connected to an out body 135 of a vehicle. Consequently, a complete circuit is formed for the vehicle accessory item to electrically communicate with the vehicular DC power system 112.

Figure 6:
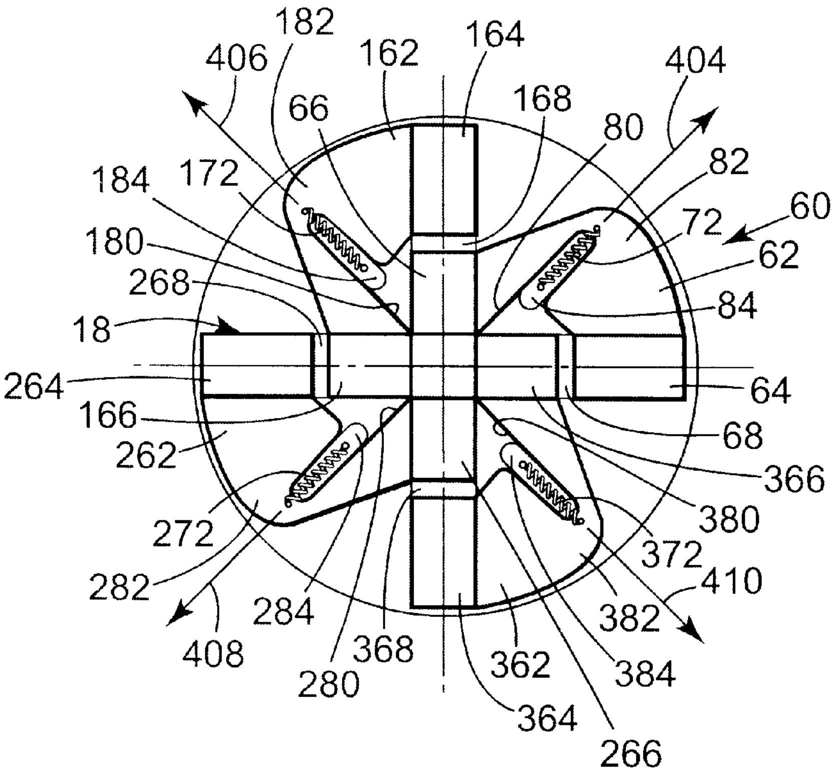
FIG. 6 is a top view of a blocking mechanism having four shutters in a blocking position useful in the practice of the present invention.
Figure 7A:
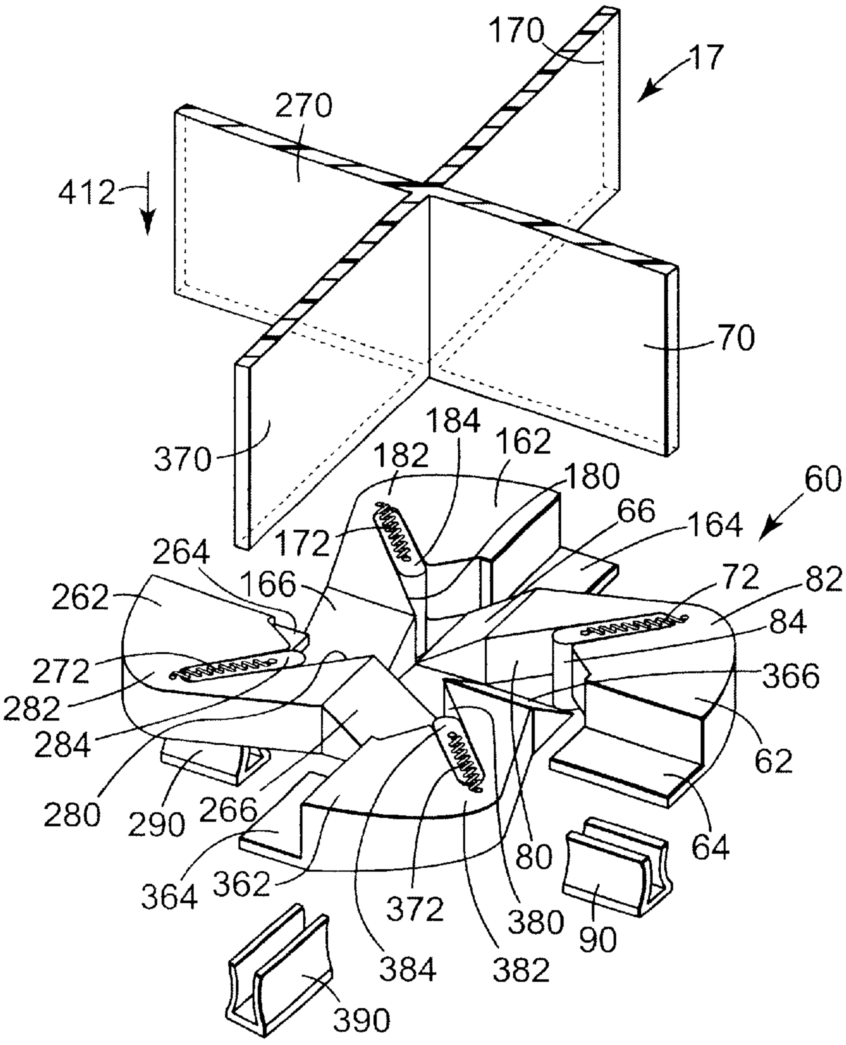
FIG. 7*a* is a perspective view of the blocking mechanism of FIG. 6 together with a generally "+"-shaped prong about to engage the blocking mechanism.
Figure 7B:
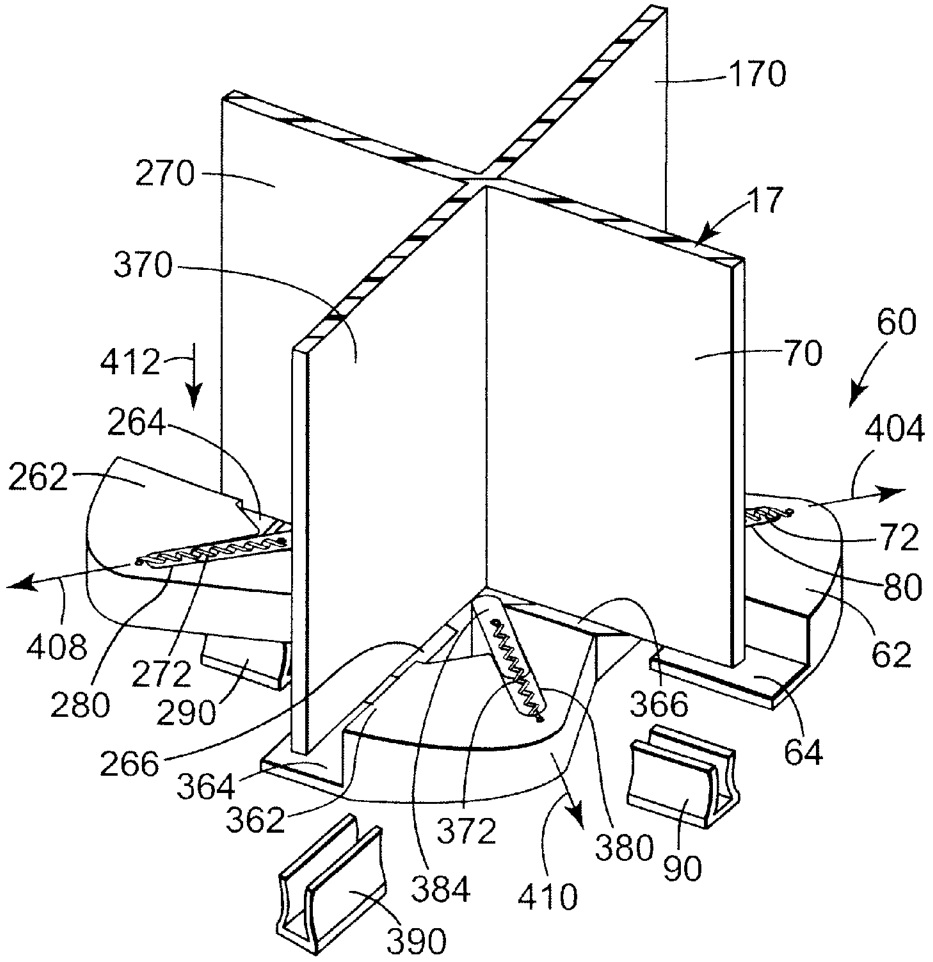
FIG. 7*b* is a perspective view of the blocking mechanism and prong of FIG. 7*a* in a position where the generally "+"-shaped prong engages the shutters of the blocking mechanism and moves the shutters from the blocking position to the unblocking position.

Referring now to FIG. 6 and FIG. 7*a*, the first slot 18 of the polarized receptacle 16 preferably has a generally "+"-shaped aperture with four extensions, namely, the first extension 68, the second extension 168, the third extension 268, and the fourth extension 368. A blocking mechanism 60 is preferably located inside the receptacle 16 and aligned with the first slot 18 for blocking improper connection to the positive contacts as well as for enabling proper connection to the positive contacts by the first prong 17 of the polarized plug 15. As illustrated in FIGS. 7*a–d*, the positive contacts 90, 190 (not shown), 290, 390 are positioned underneath the blocking mechanism 60. Each positive contact is aligned with the corresponding extension of the first slot 18. The first prong 17 of the polarized plug 15 preferably has a cross-sectional shape in a general form of a "+" (plus) sign. The generally "+"-shaped prong 17 includes four wings, namely, the first wing 70, the second wing 170, the third wing 270, and the fourth wing 370. In general, the number and orientation of the wings of first prong 17 preferably correspond to those of the extensions of slot 18.

The blocking mechanism 60 has at, least one shutter 62. Preferably, the number of the shutters is equal to the number of extensions of the first slot 18. The sizes and physical appearances of the shutters are preferably identical. As shown in FIG. 6 and FIGS. 7*a–d*, the blocking mechanism 60 in the generally "+"-shaped slot includes four identical shutters 62, 162, 262, 362.

Figure 7C:
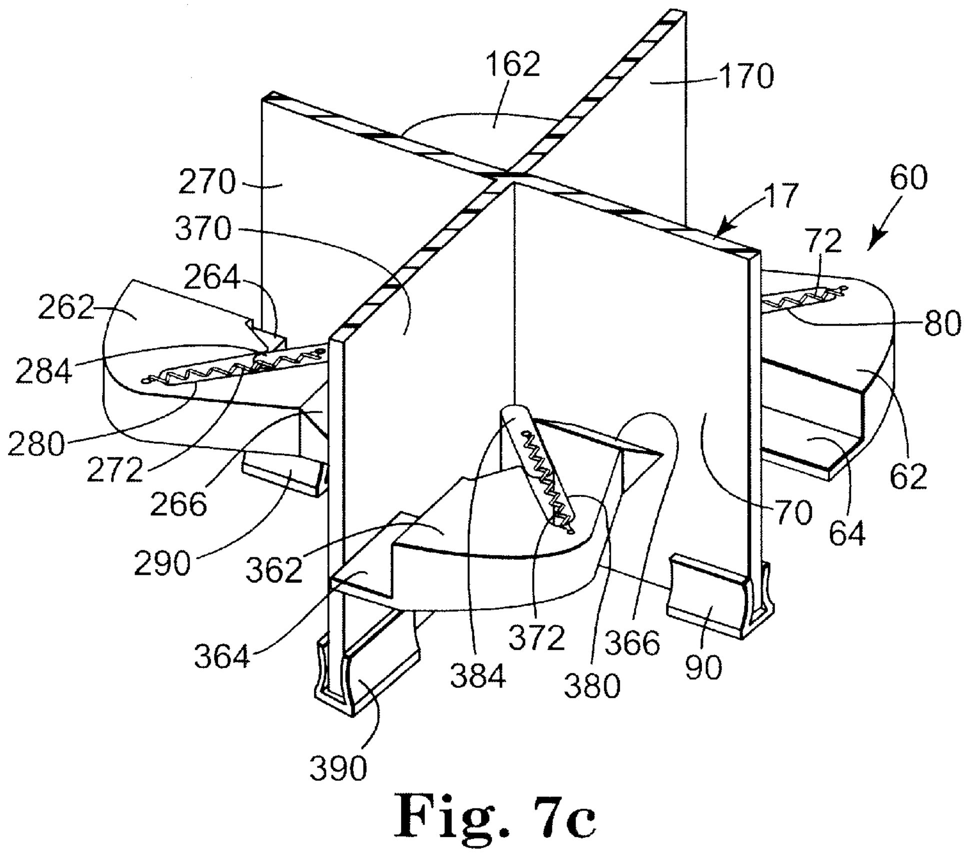
FIG. 7*c* is a perspective view of the blocking mechanism and prong of FIG. 7*b* in a position where the prong has completely moved the shutters to the unblocking position and electrically connects to positive contacts.
Figure 7D:
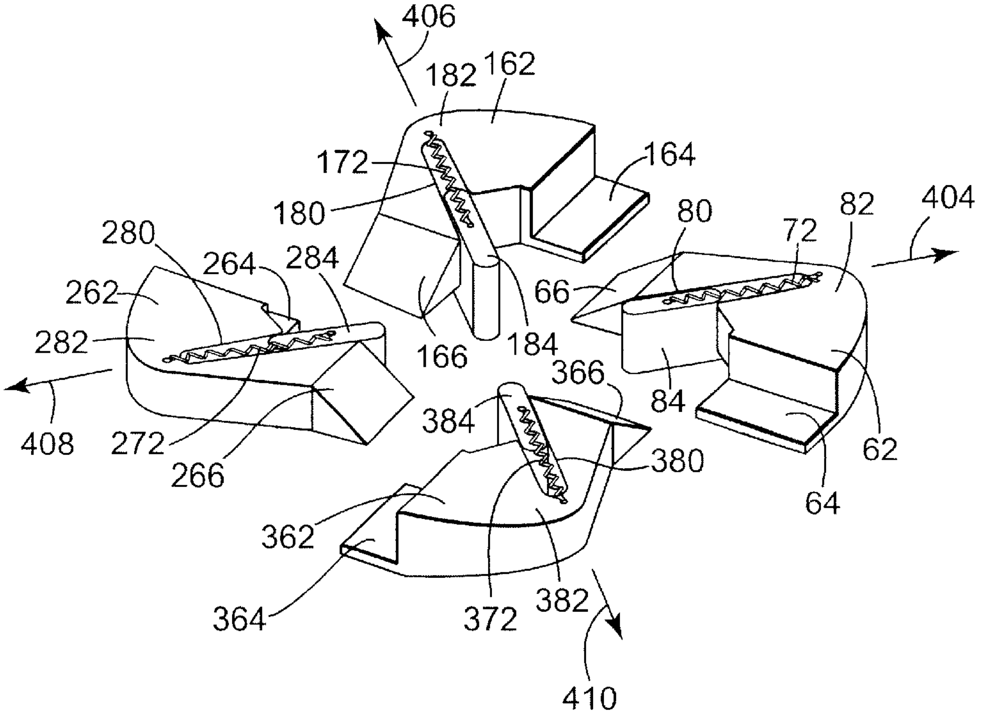
FIG. 7*d* is a perspective view of the shutters of the blocking mechanism moving from the blocking position to the unblocking position.
Figure 8:
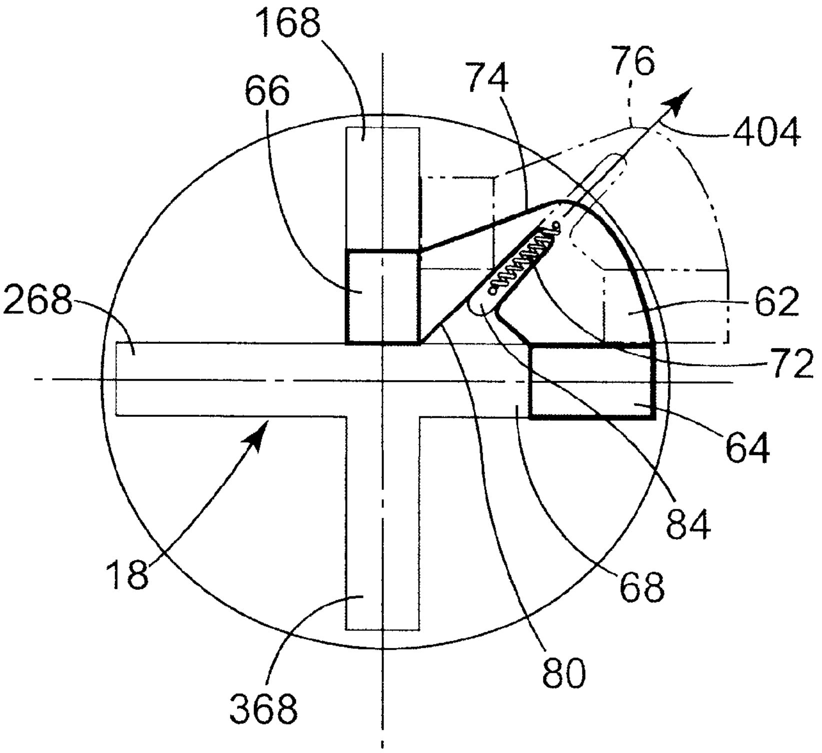
FIG. 8 is a top view of a single shutter of the blocking mechanism showing the shutter in the blocking position in solid lines and the unblocking positions in phantom.

Referring to FIG. 8, the shutter 62 is movable between the blocking position 74 and an unblocking position 76. As shown in FIG. 6 and FIGS. 7*a–d*, the shutters 162, 262, 362 are all movable between their blocking and unblocking positions. The shutter 62 includes a blocking portion 64 aligned with the first extension 68 of the first slot 18 for blocking entry of the first wing 70 when the shutter 62 is in the blocking position. When the shutter 62 moves to the unblocking position, the first wing 70 is permitted to enter into the first extension 68. The shutter 62 also includes a driving portion 66 connected to the blocking portion 64. The driving portion 66 is preferably aligned with the second extension 168 of the first slot 18.

As shown in FIGS. 7*a–c*, 8, and 9*a–c*, the driving portion 66 is movable by a second wing 170 of the first prong 17 along the direction of the arrow 404 from the blocking position 74 to the unblocking position 76, when the second wing 170 enters the second extension 168. The second wing 170 is frictionally retained by edge of the driving portion 66 when the shutter 62 is in the unblocking position 76.

Figure 10:
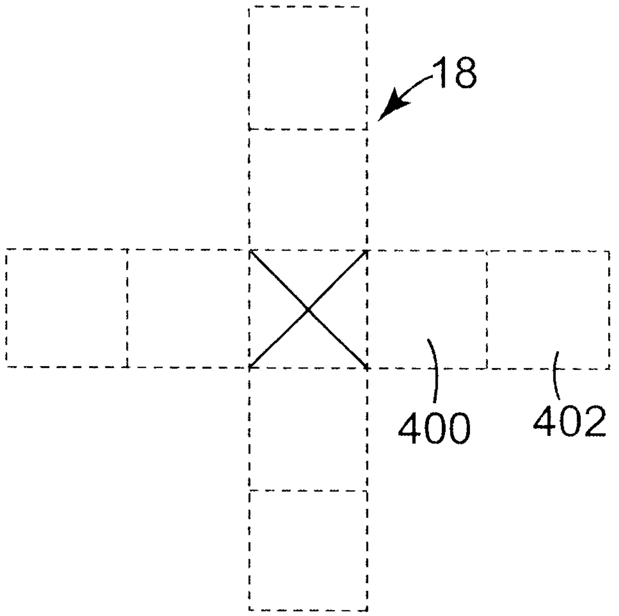
FIG. 10 is a schematic top view of a slot of a receptacle illustrating an inboard position and an outboard position.

As shown in FIG. 10, each extension of the first slot 18 has an inboard portion 400 and an outboard portion 402. The driving portion 66 is located in one of the portions 400, 402, and the blocking portion 64 is located in the other of the portions 400, 402. As shown in FIGS. 6 and 7*a*, the driving portion 66 is located in the inboard portion 400, and the blocking portion 64 is located in the outboard portion 402. The sizes of the inboard portion 400 and the outboard portion 402 can be equal or not equal.

It is to be understood that the shutter 62 includes a slide rail 80. The slide rail 80 is preferably located on an intermediate portion 82 connecting the blocking portion 64 to the driving portion 66. The blocking mechanism 60 preferably includes a fixed slide block 84 located on a base inside the receptacle 16. The fixed, slide block is engageable with the slide rail 80 to guide the shutter 62 between the blocking position 74 and the unblocking position 76 along the direction indicated by arrow 404. The direction of the arrow 404 is parallel to the slide rail 80.

In addition, the blocking mechanism 60 preferably includes a biasing member 72, which preferably is a spring. The biasing member 72 is connected between shutter 62 and the fixed slide block 84. The biasing member 72 urges the shutter 62 to the blocking position 74.

It is to be understood that the shutters 162, 262, 362 operate the same way as the shutter 62 does. It is also to be understood that the biasing members 172, 272, 372 and the fixed slide blocks 184, 284, 384 operate the same way as the biasing member 72 and the fixed slide block 84 do, respectively.

Figure 9A:
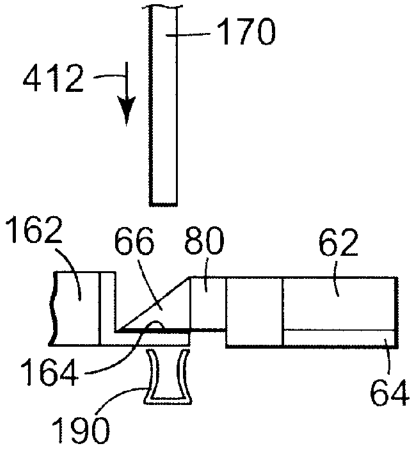
FIG. 9*a* is a fragmentary side view of shutters in the blocking position.
Figure 9B:
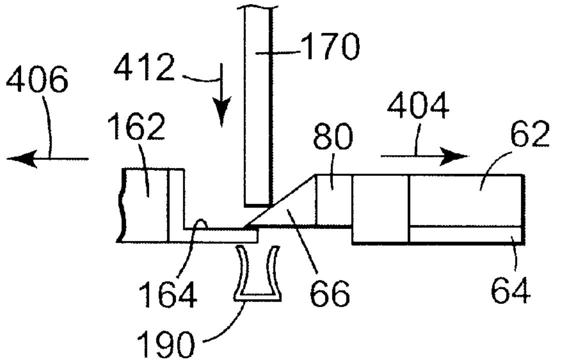
FIG. 9*b* is a fragmentary side view of shutters moving from the blocking position to the unblocking position.
Figure 9C:
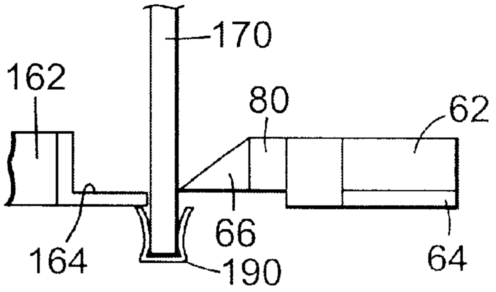
FIG. 9*c* is a fragmentary side view of shutters in the unblocking position.

FIGS. 7*a–d* and 9*a–c* show how the blocking mechanism 60 operates inside the receptacle 16 with the generally "+"-shaped slot. As shown in FIGS. 7*a–b*, 7*d*, and 9*a–b*, when the wings 70, 170, 270, 370 of the generally "+"-shaped prong push the driving portions 66, 166, 266, 366 along a direction indicated by arrow 412, the shutters 62, 162, 262, 362 respectively move along directions of the slide rails 80, 180, 280, 380 indicated by arrows 404, 406, 408, 410 against resilient forces generated by the biasing members 72, 172, 272, 372. The fixed slide blocks 84, 184, 284, 384 are engaged with the slide rails 80, 180, 280, 380 to guide the movement of the shutters 62, 162, 262, 362, respectively. In the meantime, the blocking portions 64, 164, 264, 364 move out of the way. As shown in FIG. 7*c–d* and 9*c*, as the shutters 62, 162, 262, 362 moving further along the directions indicated by arrows 404, 406, 408, 410, the blocking portions 64, 164, 264, 364 unblock access for the wings 70, 170, 270, 370. The wings 70, 170, 270, 370 then completely enter into the generally "+"-shaped slot and electrically connect to the positive contacts 90, 190 (not shown), 290, 390. In this position, the wings 170, 270, 370, 70 are frictionally retained by edges of the driving portions 66, 166, 266, 366, respectively.

To unplug the generally "+"-shaped prong from the generally "+"-shaped slot, the wings 70, 170, 270, 370 move out of the positive contacts 90, 190 (not shown), 290, 390 in a direction opposite to arrow 412. When the edges of the driving portions 66, 166, 266, 366 no longer frictionally retain the wings 70, 170, 270, 370, the shutters 62, 162, 262, 362 respectively move back to their blocking positions in directions opposite to arrows 404, 406, 408, 410. The biasing members 72, 172, 272, 372 respectively urge the shutters 62, 162, 262, 362 to their blocking positions.

The blocking mechanism 60 offers important advantages. It blocks improper connection to the positive contact and enables proper connection to the positive contact. In particular, using the blocking mechanism 60 having four shutters 62, 162, 262, 362 shown in FIG. 7*a–d*, only the generally "+"-shaped prong can completely enter into the generally "+"-shaped slot to electrically connect to the positive contacts 90, 190 (not shown), 290, 390. A "T"-shaped or "L"-shaped prong, or a prong having a single wing cannot completely enter into the generally "+"-shaped slot to electrically connect to the positive contacts 90, 190 (not shown), 290, 390. Accordingly, improper connections can be easily avoided.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. An electrical power strip for making power available from a vehicular DC power system to at least one vehicle accessory, the electrical power strip comprising:

a first conductor including a first end and a second end, the second end connectable to a positive terminal of the vehicular DC power system;

a second conductor including a first end and a second end, the second end connectable to a negative terminal of the vehicular DC power system; and at least one polarized receptacle including a first slot, a second slot, a positive contact, and a negative contact, the positive contact aligned with the first slot and connected to the first end of the first conductor, and the negative contact aligned with the second slot and connected to the first end of the second conductor, and the first slot including at least three extensions, each oriented at substantially equal degrees apart from adjacent extensions.

2. The electrical power strip of claim 1, wherein the first slot includes an axis generally perpendicular to the slot and wherein the extensions extend from the axis.

3. The electrical power strip of claim 2, wherein the first slot has a generally "+"-shaped aperture and the second slot has a generally "−"-shaped aperture.

4. The electrical power strip of claim 1 further comprising an adaptor for making power available from the electrical power strip to a vehicle accessory with a vehicle accessory plug, the adaptor including:

a first conductor including a first end and a second end;

a second conductor including a first end and a second end;

a plug-receiving socket for receiving a vehicle accessory plug, the plug-receiving socket including a positive connector connected to the first end of the first conductor and a negative connector connected to the first end of the second conductor; and a polarized plug sized and shaped for entering into the polarized receptacle of the electrical power strip, the polarized plug including a first prong connected to the second end of the first conductor and a second prong connected to the second end of the second conductor, wherein the first prong includes at least three wings, each oriented at substantially equal degrees apart from adjacent wings.

5. The polarized plug of claim 4, wherein the first prong includes an axis along a direction of the prong and wherein the wings extend from the axis.

6. The electrical power strip of claim 5, wherein the first prong of the polarized plug has a cross-sectional shape in a general form of a "+" sign and the second prong has a cross-sectional shape in a general form of a "−" sign.

7. An electrical power strip for making power available from a vehicular DC power system to at least one vehicle accessory, the electrical power strip comprising:

a conductor including a first end and a second end, the second end connectable to a positive terminal of the vehicular DC power system; and at least one polarized receptacle including a slot and a positive contact, the positive contact aligned with the slot and connected to the first end of the conductor, and the slot including at least three extensions, each oriented at substantially equal degrees apart from adjacent extensions.

8. The electrical power strip of claim 7, wherein the slot includes an axis generally perpendicular to the slot and wherein the extensions extend from the axis.

9. The electrical power strip of claim 8, wherein the slot has a generally "+"-shaped aperture.

10. An electrical power strip for making power available from a vehicular DC power system to at least one vehicle accessory, the electrical power strip comprising:

a conductor including a first end and a second end, the second end connectable to a positive terminal of the vehicular DC power system; and at least one polarized receptacle including a slot and a positive contact, the positive contact aligned with the slot and connected to the first end of the conductor, and the slot including at least four extensions, each angularly oriented with respect to adjacent extensions.

11. A polarized plug for use with a DC powered vehicle accessory, comprising:

an insulating plug body; and a first prong mounted to the insulating plug body, the first prong including at least three wings, each oriented at substantially equal degrees apart from adjacent wings.

12. The polarized plug of claim 11, wherein the first prong includes an axis along a direction of the prong and wherein the wings extend from the axis.

13. The polarized plug of claim 12, wherein the first prong has a cross-sectional shape in a general form of a "+" sign.

14. The polarized plug of claim 13 further comprising a second prong having a cross-sectional shape in a general form of a "−" sign, wherein the second prong is mounted to the plug body and is aligned with the first prong.

15. A polarized plug for use with a DC powered vehicle accessory, comprising:

an insulating plug body; and a prong mounted to the insulating plug body, the prong including at least four wings angularly oriented with respect to each other.

16. An electrical power strip for making power available from a vehicular DC power system to at least one vehicle accessory, the electrical power strip comprising:

a conductor including a first end and a second end, the second end connectable to a positive terminal of the vehicular DC power system;

at least one polarized receptacle including a slot and a positive contact, the positive contact aligned with the slot and connected to the first end of the conductor, and the slot including a plurality of extensions angularly oriented with respect to each other; and a blocking mechanism inside the polarized receptacle for selectively blocking and enabling connection to the positive contact by a prong of a plug of a vehicle accessory, the blocking mechanism including:

at least one shutter movable between a blocking position and an unblocking position, the shutter including:

a blocking portion aligned with a first extension of the first slot for blocking entry of a first wing of the prong into the first extension to electrically connect to the positive contact when the shutter is in the blocking position and for permitting entry of the first wing into the first extension to electrically connect to the positive contact when the shutter is in the unblocking position; and a driving portion connected to the blocking portion and aligned with a second extension of the first slot, the driving portion movable by a second wing of the prong to move the shutter from the blocking position to the unblocking position when the second wing enters the second extension.

17. The electrical power strip of claim 16, wherein the blocking mechanism further includes a means for urging the first shutter to the blocking position.

18. The electrical power strip of claim 16, wherein the second wing of the prong is frictionally retained by the driving portion when the shutter is in the unblocking position.

19. The electrical power strip of claim 16, wherein the shutter further includes a slide rail and the blocking mechanism further includes a fixed slide block engageable with the slide rail to guide the shutter between the blocking position and the unblocking position.

20. The electrical power strip of claim 16, wherein the blocking portion is in an outboard portion of the first extension of the first slot and the driving portion is in an inboard portion of the second extension of the first slot.

21. The electrical power strip of claim 16, wherein the blocking portion is in an inboard portion of the first extension of the first slot and the driving portion is in an outboard portion of the second extension of the first slot.

* * * * *